US008624817B2

(12) United States Patent
Kim et al.

(10) Patent No.: US 8,624,817 B2
(45) Date of Patent: Jan. 7, 2014

(54) METHOD OF SYNCHRONIZING A DRIVING DEVICE AND DISPLAY APPARATUS FOR PERFORMING THE METHOD

(75) Inventors: Yong-Bum Kim, Yongin-si (KR); Dong-Hyun Yeo, Goyang-si (KR); Byung-Kil Jeon, Asan-si (KR)

(73) Assignee: Samsung Display Co., Ltd. (KR)

( * ) Notice: Subject to any disclaimer, the term of this patent is extended or adjusted under 35 U.S.C. 154(b) by 447 days.

(21) Appl. No.: 12/605,611

(22) Filed: Oct. 26, 2009

(65) Prior Publication Data

US 2010/0302214 A1 Dec. 2, 2010

(30) Foreign Application Priority Data

Jun. 2, 2009 (KR) .............................. 2009-0048753

(51) Int. Cl.
*G09G 3/36* (2006.01)
(52) U.S. Cl.
USPC ......................................................... 345/99
(58) Field of Classification Search
USPC ........... 345/99, 55, 84, 38, 39, 50; 349/98, 99
See application file for complete search history.

(56) References Cited

U.S. PATENT DOCUMENTS

2006/0077197 A1* 4/2006 Lin ................................ 345/204
2008/0129652 A1* 6/2008 Park ................................ 345/55

FOREIGN PATENT DOCUMENTS

| JP | 11-003070 A | 1/1999 |
| KR | 1020040078396 A | 9/2004 |
| KR | 1020080012520 A | 2/2008 |

* cited by examiner

*Primary Examiner* — Chanh Nguyen
*Assistant Examiner* — Ram Mistry
(74) *Attorney, Agent, or Firm* — Cantor Colburn LLP

(57) ABSTRACT

A display apparatus includes a driving part and a display panel. The driving part includes a master timing controller and at least one slave timing controller synchronized with the master timing controller using a first data enable signal received by the master timing controller and a second data enable signal received by the slave timing controller. The display panel displays a first image on a first display block, and displays a second image on a second display block using the master timing controller.

21 Claims, 12 Drawing Sheets

METHOD OF SYNCHRONIZING A DRIVING DEVICE AND DISPLAY APPARATUS FOR PERFORMING THE METHOD

This application claims priority to Korean Patent Application No. 10-2009-0048753, filed on Jun. 2, 2009, and all the benefits accruing therefrom under 35 U.S.C. §119, the content of which in its entirety is herein incorporated by reference.

BACKGROUND OF THE INVENTION (1) Field of the Invention

Exemplary embodiments of the present invention relate to a method of synchronizing a driving apparatus and a display apparatus for performing the method. More particularly, exemplary embodiments of the present invention relate to a method of synchronizing a driving apparatus including a multi-chip structure, and a display apparatus for performing the method.

(2) Description of the Related Art

Recently, liquid crystal display ("LCD") apparatuses have been used in various applications, such as computer games using high-resolution videos and three-dimensional ("3D") images.

In these devices, a motion interpolation frame is typically inserted between a present frame, e.g., a current frame, and a previous frame to decrease motion blur when displaying high-resolution video. Generally, a high-speed frame driving method is used to insert the motion interpolation frame between the present frame and the previous frame.

Additionally, a frame image is divided into a left-eye image and a right-eye image, the left- and right-eye images having binocular disparity, to display a 3D image. Thus, to display the 3D image, one frame image is divided into a left-eye frame and a right-eye frame, and a high-speed frame driving method is used to display the 3D image.

The high-speed frame driving method may use a driving device having a multi-chip structure including two or more timing controllers, and may operate at a frequency of about 60 hertz (Hz) or, alternatively, about 120 Hz. In the driving device having the multi-chip structure, however, an image is abnormally displayed when synchronization between the chips is not matched. In addition, waterfall defects and charge rate defects are be generated.

BRIEF SUMMARY OF THE INVENTION

Exemplary embodiments of the present invention include a method of synchronizing a driving device, which provides benefits that include, but are not limited to, a decreased number of display defects, such as abnormal image display, as well as waterfall and charge rate defects.

Exemplary embodiments of the present invention also provide a display apparatus for performing the method of synchronizing the driving device.

In an exemplary embodiment of a method of synchronizing a driving device, the driving device including timing controllers, the method includes receiving data enable signals from an external source. A synchronization signal is generated using a first data enable signal of the data enable signals received by a master timing controller of the timing controllers and a second data enable signal of the data enable signals received by at least one slave timing controller of the timing controllers. The synchronization signal synchronizes between the master timing controller and the slave timing controller.

In an alternative exemplary embodiment, a display apparatus includes a driving part and a display panel. The driving part includes a master timing controller synchronized with at least one slave timing controller using a first data enable signal received by the master timing controller and a second data enable signal received by the slave timing controller. The display panel displays a first image on a first display block, and displays a second image on a second display block using the master timing controller.

Thus, according to exemplary embodiments of the present invention, a master timing controller of a plurality of timing controllers provides a synchronization signal to a slave timing controller of the plurality of timing controllers, and synchronization of the master and slave timing controllers is effectively controlled to substantially improve a display quality of a display apparatus.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
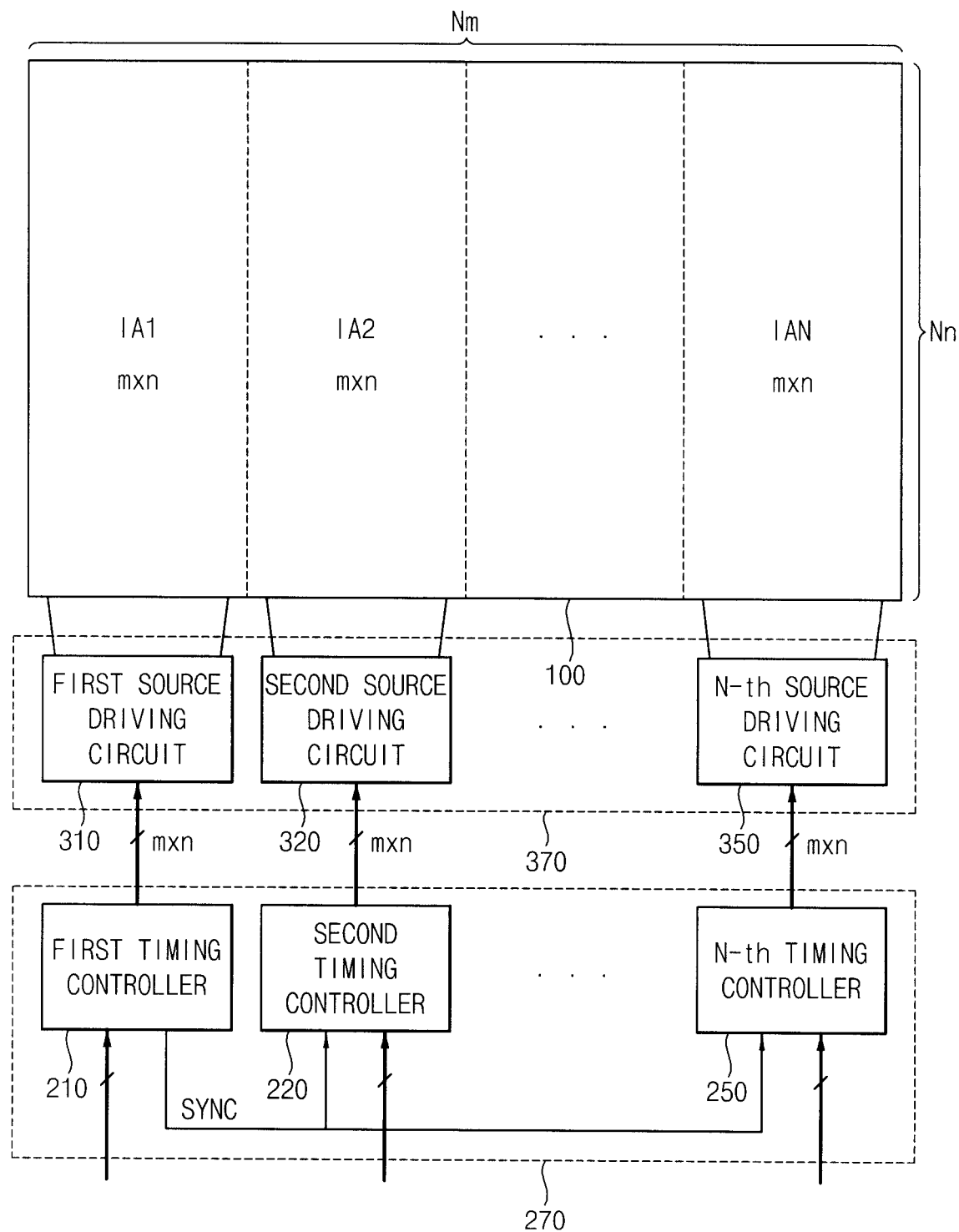
FIG. 1 is a block diagram of an exemplary embodiment of a display apparatus according to the present invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the present invention will be described in further detail with reference to the accompanying drawings.

FIG. 1 is a block diagram illustrating an exemplary embodiment of a display apparatus according to the present invention.

Referring to FIG. 1, the display apparatus according to an exemplary embodiment includes a display panel 100, a driving part 270 and a source driving part 370. The driving part 270 includes N timing controllers 210, 220, . . . , and 250, e.g., first through N-th timing controllers 210 through 250, and the source driving part 370 includes N source driving circuits 310, 320, . . . , and 350, e.g., first through N-th source driving circuits 310 through 350. It will be noted that a number of the timing controllers and the source driving parts is not particularly limited to the description or drawings herein. In addition, in an exemplary embodiment, the number of the timing controllers is equal to the number of the source driving circuits; however, the number of the timing controllers may be different from the number of the source driving circuits in alternative exemplary embodiments. For example, one timing controller may connect to a plurality of source driving circuits or, alternatively, one source driving circuit may connect to a plurality of timing controllers. However, for purposes of description hereinafter, the number of the timing controllers and the number of the source driving circuits are equal.

The display panel 100 includes Nm×Nn pixels. The display panel 100 is divided into display blocks IA and, more particularly, is divided into N display blocks IA1, IA2, . . . , and IAN. A number of the display blocks IA corresponds to the number of the timing controllers 2110 through 250. In an exemplary embodiment, 'N,' 'm' and 'n' are natural numbers.

Thus, as shown in FIG. 1, the driving part 270 includes N timing controllers 210, 220, . . . , and 250 corresponding to the N display blocks IA1, IA2, . . . , and IAN, respectively. The N timing controllers 210, 220, . . . , and 250 receives N group image data from an external source (not shown), and the N timing controllers 210, 220, . . . , and 250 output the N group image data in synchronization with each other.

Figure 2:
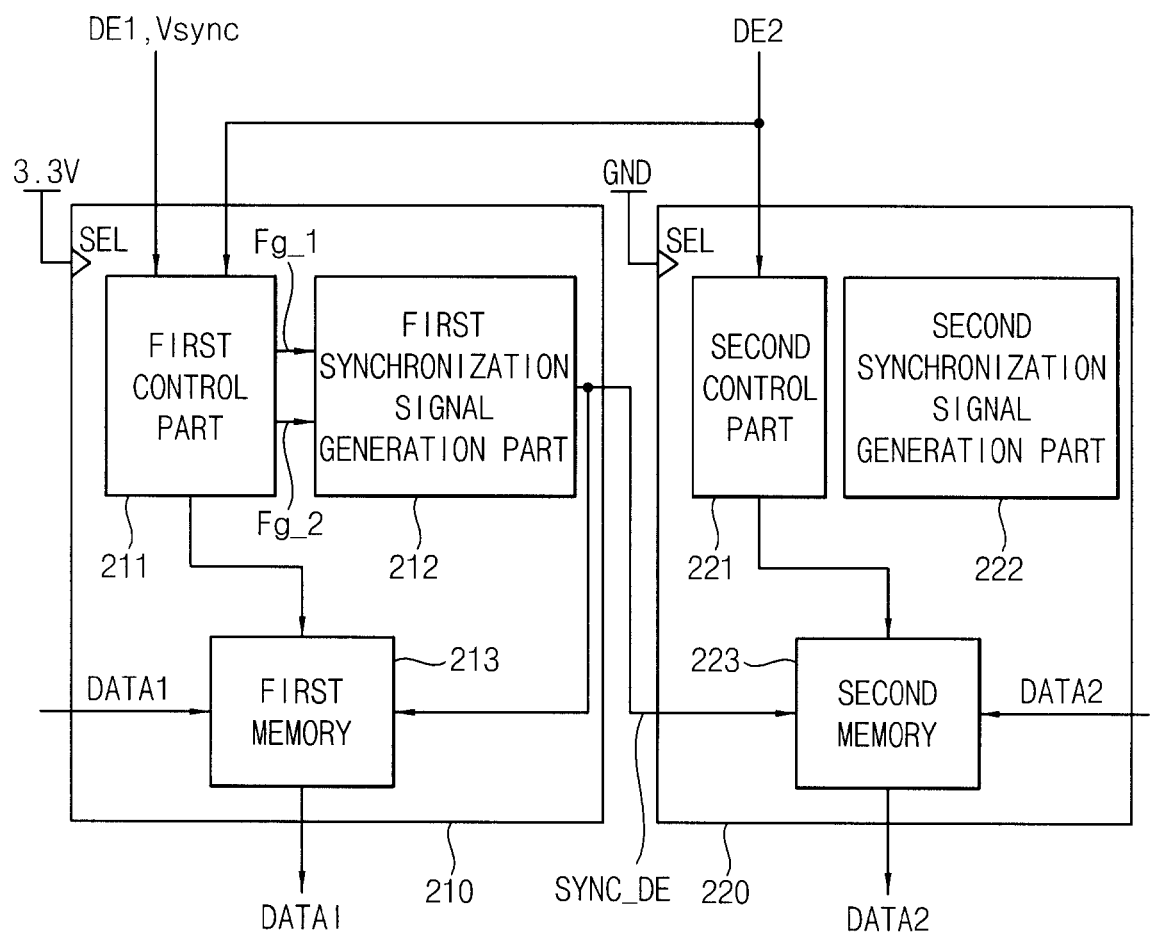
FIG. 2 is a block diagram of a master timing controller and a slave timing controller of the display apparatus of FIG. 1.

More specifically, for example, the first timing controller 210 receives first group image data, corresponding to the first display block IA1, and a first data enable signal DE1 (FIG. 2), while the second timing controller 220 receives second group image data, corresponding to the second display block IA2, and a second data enable signal DE2 (FIG. 2). Similarly, the N-th timing controller 250 receives N-th group image data corresponding to the N-th display block IAN and an N-th data enable signal DEN (not shown).

The N timing controllers 210, 220, . . . , and 250 are divided into, e.g., are classified as, either a master timing controller or a slave timing controller for synchronization of all the N timing controllers 210, 220, . . . , and 250. For example, when the first timing controller 210 is operated as the master timing controller, the remaining timing controllers 220 through 250 are operated as slave timing controllers. In an exemplary embodiment, and assuming for purposes of description herein that the first timing controller 210 is a master timing controller 210, the master timing controller 210 is synchronized with the slave timing controllers 220 through 250 based on a synchronization signal SYNC (FIG. 1), as will be described in further detail below.

Figure 10:
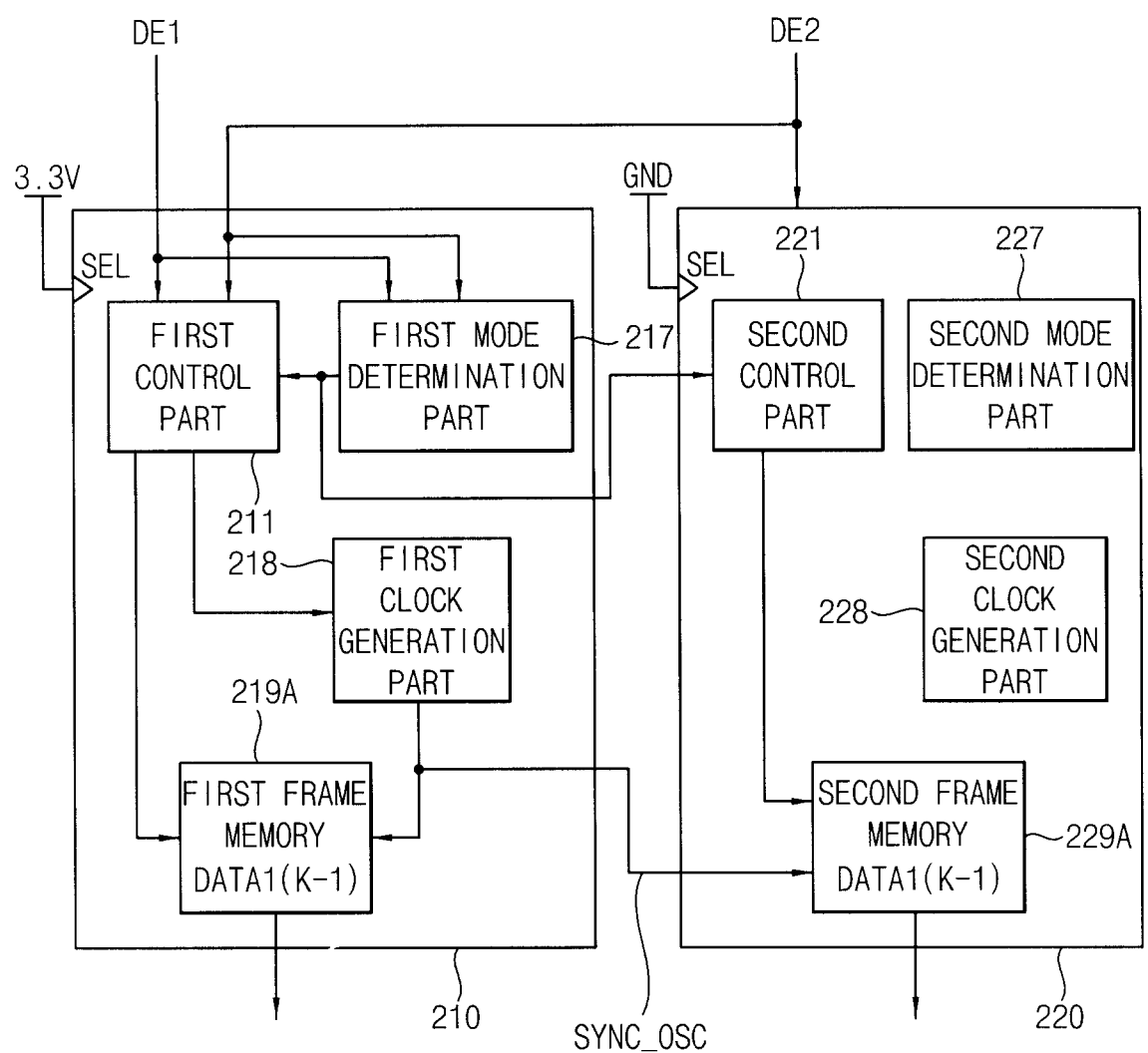
FIG. 10 is a block diagram for describing an exemplary embodiment of a synchronization of a previous frame between a master timing controller and a slave timing controller in an abnormal mode.
Figure 12:
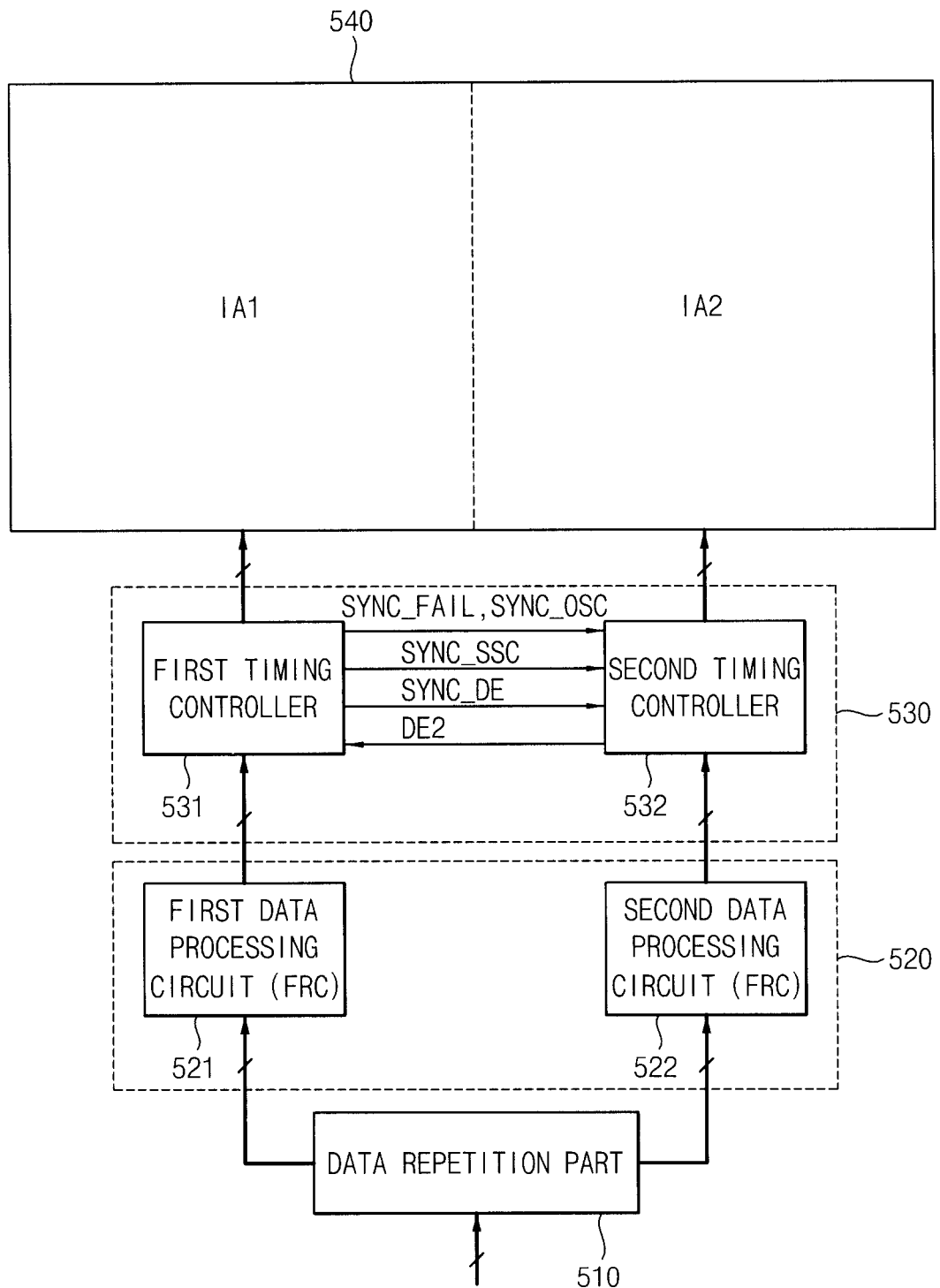
FIG. 12 is a block diagram illustrating an alternative exemplary embodiment of a display apparatus according to the present invention.
Figure 13:
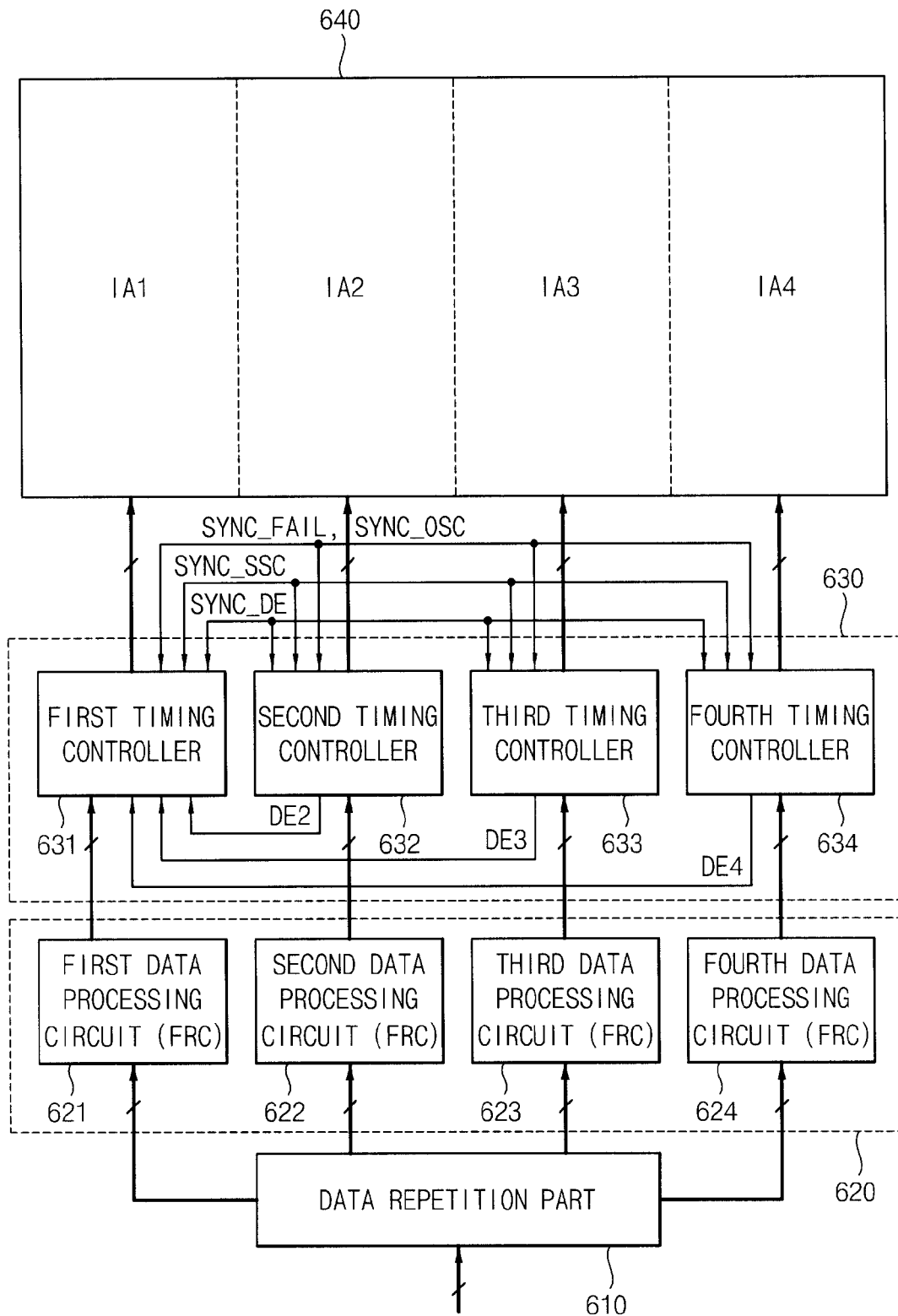
FIG. 13 is a block diagram illustrating another alternative exemplary embodiment of a display apparatus according to the present invention.

In an exemplary embodiment, for example, the synchronization signal SYNC may include a data enable synchronization signal SYNC_DE (FIG. 2), a spread spectrum clock signal SYNC_SSC (FIG. 4), an error mode signal SYNC_FAIL (FIGS. 12 and 13) and an error clock signal SYNC_OSC (FIGS. 10 and 12-13). The abovementioned signals will be described in greater detail below with reference to the accompanying drawings.

Referring still to FIG. 1, the source driving part 370 includes the N source driving circuits 310, 320, . . . , and 350 corresponding to the N the timing controllers 210, 220, . . . , and 250. The N source driving circuits 310, 320, . . . , and 350 convert the N group image data, provided from the N timing controllers 210, 220, . . . , and 250, into analog data signals, and provides the analog data signals to the N display blocks IA1, IA2 through IAN of the display panel 100 to display an image thereon.

More particularly, the first source driving circuit 310 provides a data voltage to m×n pixels corresponding to a first display block IA1, and the second source driving circuit 320 provides a data voltage to m×n pixels corresponding to a second display block IA2. Similarly, the N-th source driving circuit 350 provides a data voltage to m×n pixels corresponding to an N-th display block IAN. It will be noted that exemplary embodiments are not limited to the three source driving circuits and corresponding display blocks shown in FIG. 1 and described herein In an exemplary embodiment, the display panel 100 displays a frame of an image having a resolution of Nm×Nn, and a frame frequency of the display panel 100 may be about 60 hertz (Hz), but alternative exemplary embodiments are not limited thereto. For example, the frame frequency may be about 120 Hz or, alternatively, about 240 Hz. In an exemplary embodiment, the source driving part 370 and the driving part 270 have a one-to-one correspondence, as described herein, but alternative exemplary embodiments are not limited thereto. For example, each of the N timing controllers 210, 220, . . . , and 250 may be correspond to a plurality of the source driving circuits, as discussed above.

FIG. 2 is a block diagram of the master timing controller 210 and the slave timing controller 220 of the display apparatus shown in FIG. 1.

Referring to FIG. 2, the first timing controller 210, e.g., the master timing controller 210, includes a first control part 211, a first synchronization signal generation part 212 and a first memory 213. A state of the first timing controller 210 is set based on a voltage applied to a first selection terminal SEL thereof. More specifically, the first timing controller 210 is set to operate as the master timing controller 210, such as by applying a high level voltage, e.g., about 3.3 volts (V), to the first selection terminal SEL, for example. The second timing controller 220, e.g., the slave timing controller 220, includes a second control part 221, a second synchronization signal generation part 222 and a second memory 223. A state of the second timing controller 220 is set based on a voltage applied to a second selection terminal SEL thereof, and, more particularly, the second timing controller 220 is set to operates as the slave timing controller 220 by applying a low level voltage GND, which has a low level relative to the voltage applied to the first selection terminal SEL of the first timing controller 210, to the second selection terminal SEL of the second timing controller 220, for example. In an exemplary embodiment, the first memory 213 and/or the second memory 223 may be a line memory, but alternative exemplary embodiments are not limited thereto.

In an exemplary embodiment, components of the first timing controller 210 may be substantially the same as to components of the second timing controller 220. However, corresponding elements of the first timing controller 210 and the second timing controller 220 may be operated differently, or not operated at all, in the first timing controller 210 as compared to the second timing controller 220, based on whether a given timing controller is operated as a master timing controller, e.g., in master operation, or as a slave timing controller, e.g., in slave operation. Hereinafter, for purposes of description, the first timing controller 210 will be described as being operated as a master, e.g., the first timing controller 210 will be the master timing controller, but it will be noted that alternative exemplary embodiment are not limited thereto.

Referring still to FIG. 2, the first control part 211 stores first group image data DATA1, received in response to the first data enable signal DE1, to the first memory 213 in line units, for example.

The first control part 211 generates a first flag signal Fg_1 and a second flag signal Fg_2 using the first data enable signal DE1 and the second data enable signal DE2 received by both the first timing controller 210 and the second timing controller 220. For example, the first control part 211 may generate the first flag signal Fg_1 when a vertical synchronization signal Vsync is at a high level and/or transitioning to a high level, in synchronization with a pulse of the first data enable signal DE1, which is firstly received by the first control part 211 relative to other signals received by the first control part 211, such as the second data enable signal DE2. The first control part 211 generates the second flag signal Fg_2 when the vertical synchronization signal Vsync is the high level and/or is transitioning to the high level in synchronization with a pulse of the second data enable signal DE2 firstly received by the first control part 211.

The first synchronization signal generation part 212 generates the data enable synchronization signal SYNC_DE when both the first and second flag signals Fg_1 and Fg_2, respectively, are at a high level. Thus, the data enable synchronization signal SYNC_DE is synchronized with a data enable signal corresponding to one of the first and second flag signals Fg_1 and Fg_2, respectively, which reaches a high level later.

The first synchronization signal generation part 212 provides the data enable synchronization signal SYNC_DE to the first memory 213, and the second timing controller 220 is operated as the slave.

The first memory 213 outputs the first group image data DATA1 in synchronization with the data enable synchronization signal SYNC_DE.

Hereinafter, the second timing controller 220, operated as the slave timing controller 220, will be described, but it will be noted that alternative exemplary embodiments are not limited thereto.

Referring still to FIG. 2, the second control part 221 stores a second group image data DATA2, received in response to the second data enable signal DE2, in the second memory 223 in line units, for example.

In an exemplary embodiment in which the second timing controller 220 is the slave timing controller 220, the second control part 221 does not generate first or second flag signals, and the second synchronization signal generation part 222 essentially does not operate, because the second timing controller 220 operates as the slave.

The second memory 223 outputs the second group image data DATA2 in synchronization with the data enable synchronization signal SYNC_DE provided from the first timing controller 210, which is operated as the master.

Therefore, in an exemplary embodiment, the first memory 213 of the first timing controller 210 and the second memory 223 of the second timing controller 220 output the first group image data DATA1 and the second group image data DATA2, respectively, simultaneously, based on the data enable synchronization signal SYNC_DE provided from the master timing controller 210. Likewise, all of the N timing controllers 210, 220, . . . , and 250 (FIG. 1) output respective line data simultaneously.

Figure 3A:
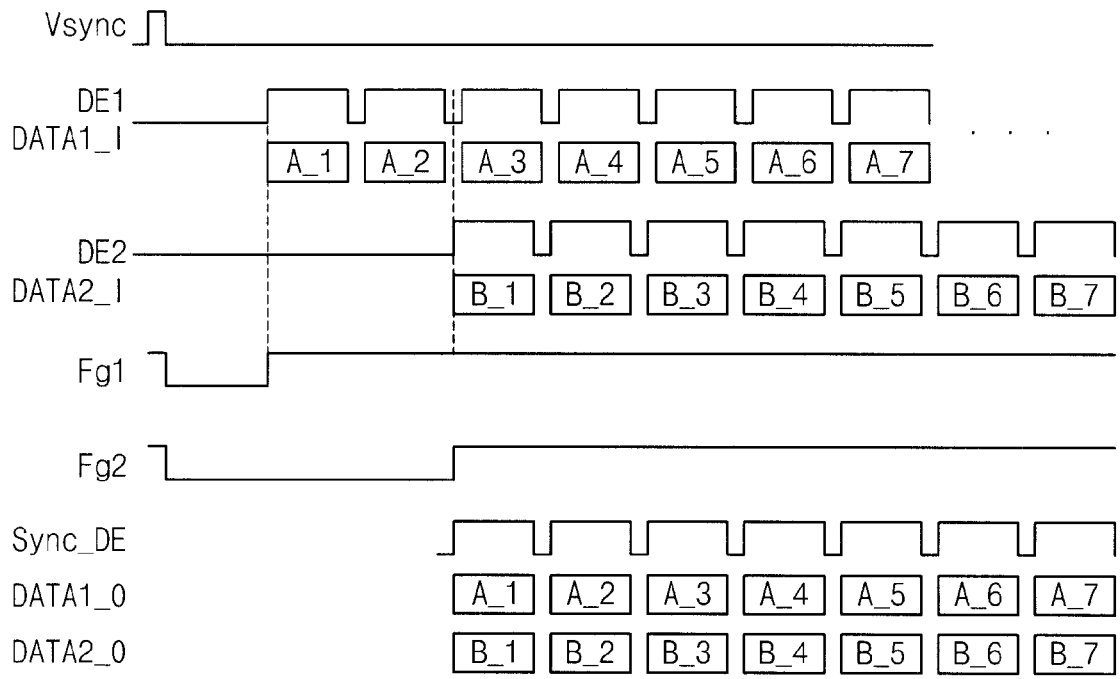
FIGS. 3A and 3B are signal timing diagrams illustrating signals of the master timing controller and the slave timing controller of FIG. 2.
Figure 3B:
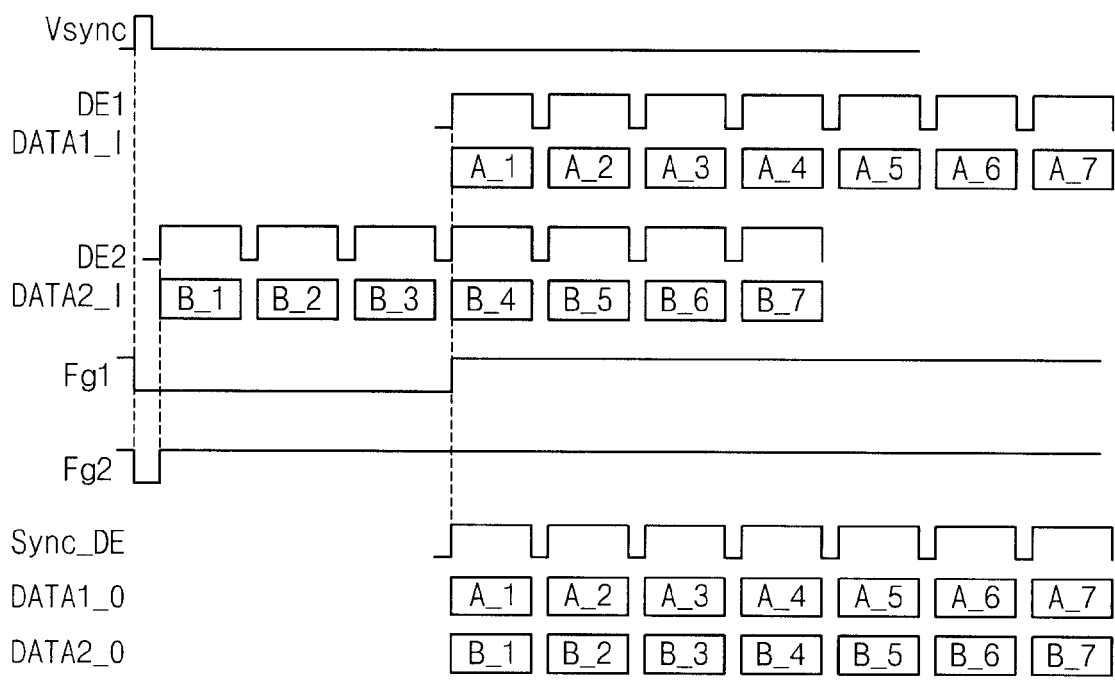

FIGS. 3A and 3B are signal timing diagrams illustrating input/output signals of the master timing controller and the slave timing controller shown in FIG. 2.

Referring to FIGS. 2 and 3A, the first control part 211 stores first group image data DATA1_I received in synchronization with the first data enable signal DE1 in the first memory 213 in line units A_1, A_2, . . . A_7, for example. The first and second line data A_1 and A_2, respectively, are stored in the first memory 213. The first control part 211 generates the first flag signal Fg_1 based on the first data enable signal DE1, which is received earlier than the second data enable signal DE2, and the first control part 211 generates the second flag signal Fg_2 based on the second data enable signal DE2, which is received later than the first data enable signal DE1, as shown in FIG. 3A.

The first synchronization signal generation part 212 generates the data enable synchronization signal SYNC_DE using the first and second flag signals Fg_1 and Fg_2. The data enable synchronization signal SYNC_DE is synchronized with the DE2 received by the first control part 211 later than the first data enable signal DE1, as shown in FIG. 3A.

The first memory 213 and the second memory 223 output respective line data of the first group image data DATA1 and the second group image data DATA2 simultaneously as DATA1_0 and DATA2_0 in synchronization with the data enable synchronization signal SYNC_DE.

Referring to FIGS. 2 and 3B, the second control part 221 stores second group image data DATA2_I received in synchronization with the second data enable signal DE2 to the second memory 223 in line units B_1, B_2, . . . , B_7, for example. The first, second and third line data B_1, B_2 and B_3, respectively, are stored in the second memory 223.

The first control part 211 generates the second flag signal Fg_2 based on the second data enable signal DE2, which is received earlier than the first data enable signal DE1, and the first control part 211 then generates the first flag signal Fg_1 based on the first data enable signal DE1, which is received later than the second data enable signal DE2, as shown in FIG. 3B.

The first synchronization signal generation part 212 generates the data enable synchronization signal SYNC_DE using the first and second flag signals Fg_1 and Fg_2, respectively. The data enable synchronization signal SYNC_DE is synchronized with the DE1 received by the first control part 211 later than the second data enable signal DE2.

The first memory 213 and the second memory 223 output respective line data of the first group image data DATA1 and the second group image data DATA2 simultaneously as DATA1_0 and DATA2_0 in synchronization with the data enable synchronization signal SYNC_DE. The first memory 213 and the second memory 223 may be line memory or frame memory, according to a storing data capacity of a given exemplary embodiment. Thus, in an exemplary embodiment, the first and second timing controllers 210 and 220, respectively, are operated as master and slave, respectively, according to signals supplied to the selection terminals SEL applied thereto, but alternative exemplary embodiments are not limited thereto. In alternative exemplary embodiment, for example, the master timing controller and the slave timing controller may be determined without signals being applied to the selection terminals SEL thereof, such as by differently designing the master timing controller and the slave timing controller, and thus any subsequently unnecessary elements of the slave timing controller may be omitted.

Figure 4:
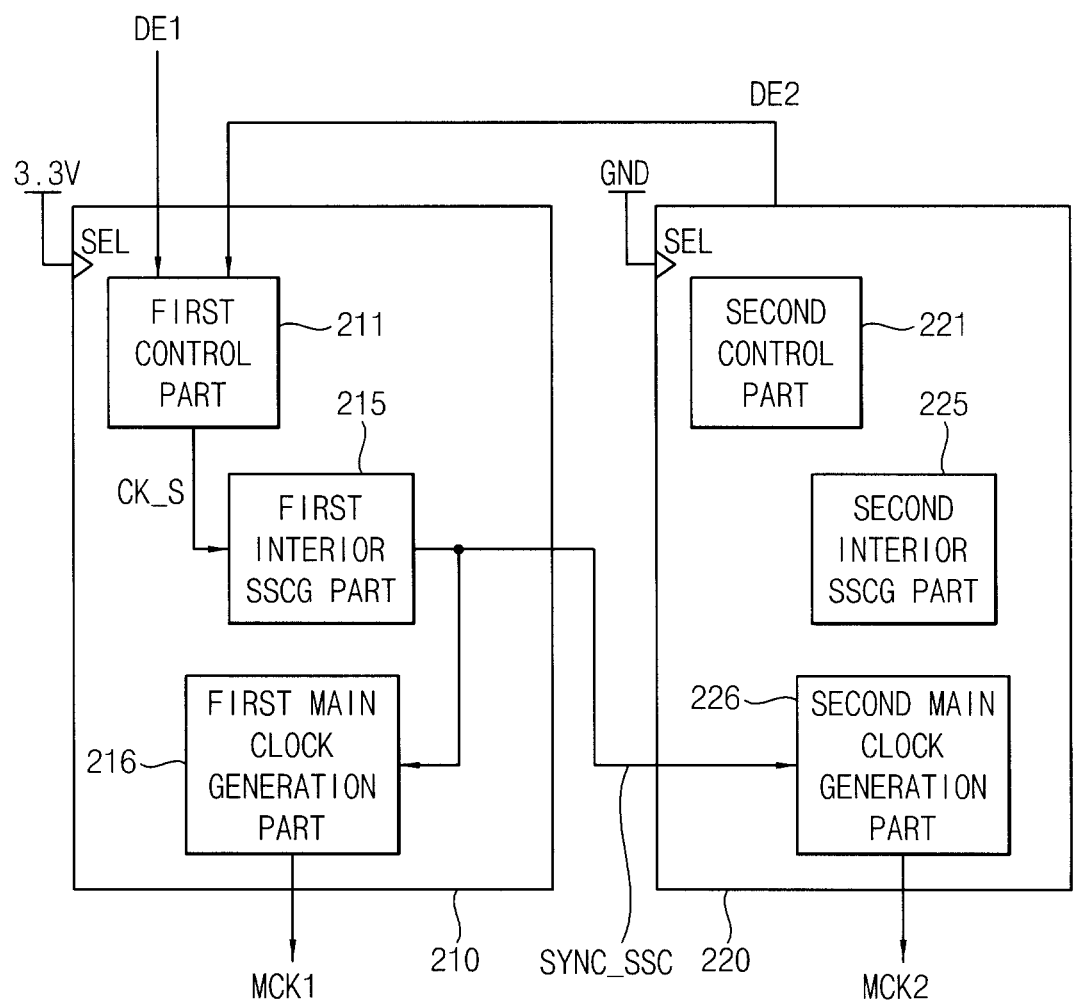
FIG. 4 is a block diagram of an exemplary embodiment of a master timing controller and a slave timing controller using an interior spread spectrum clock generation ("SSCG") part of the display apparatus of FIG. 1.
Figure 5:
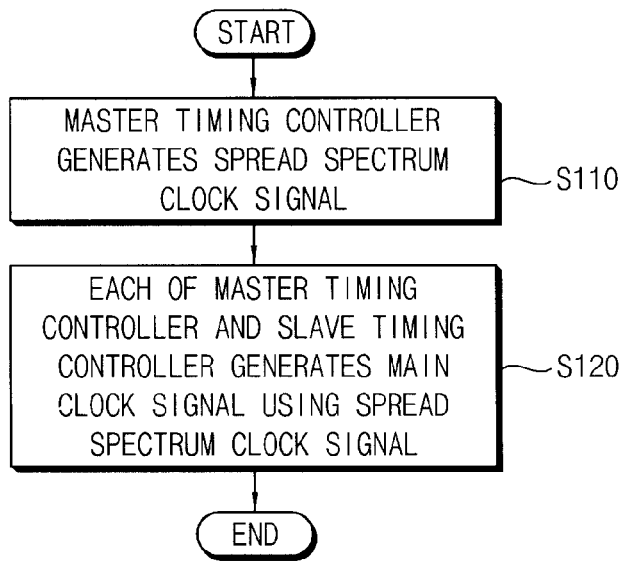
FIG. 5 is a flowchart for describing an exemplary embodiment of a method of driving the master timing controller and the slave timing controller shown in FIG. 4.

FIG. 4 is a block diagram of an exemplary embodiment of a master timing controller and a slave timing controller using an interior spread spectrum clock generation ("SSCG") part. FIG. 5 is a flowchart for describing an exemplary embodiment of a method of driving the master timing controller and the slave timing controller shown in FIG. 4.

Referring to FIGS. 2, 4 and 5, the first timing controller 210 according to an exemplary embodiment may further include a first interior SSCG part 215 and a first main clock generation part 216, and the second timing controller 220 may further include a second interior SSCG part 225 and a second main clock generation part 226.

Hereinafter, an exemplary embodiment in which the first timing controller 210 is operated as a master timing controller 210 will be described in further detail, but it will be noted that alternative exemplary embodiments are not limited thereto.

In an exemplary embodiment, the first interior SSCG part 215 generates a spread spectrum clock signal SYNC_SSC by modulating a source clock signal CK_S, provided from the first control part 211, into the spread spectrum clock signal SYNC_SSC, which is for decreasing electromagnetic interference ("EMI") (step S110 of FIG. 5). In an exemplary embodiment, the spread spectrum clock signal SYNC_SSC decreases electromagnetic interference in the display apparatus.

The first interior SSCG part 215 simultaneously provides the spread spectrum clock signal SYNC_SSC to the first main clock generation part 216 and the second timing controller 220.

The first main clock generation part 216 generates a first main clock signal MCK1 using the spread spectrum clock signal SYNC_SSC (step S120). The first main clock signal MCK1 may be used as a pixel (or, alternatively, a dot) clock signal for controlling a pixel data in a source driving circuit (FIG. 1).

In an exemplary embodiment, generating the first main clock signal MCK1 using the spread spectrum clock signal SYNC_SSC is more efficient in decreasing electromagnetic interference than by case generating the first main clock signal MCK1 using the source clock signal CK_S.

Hereinafter, an exemplary embodiment in which the second timing controller 220 is operated as a slave timing controller 220 will be described in further detail, but it will be noted that alternative exemplary embodiments are not limited thereto.

The second interior SSCG part 225 does not operate in an exemplary embodiment, because the second timing controller 220 operates as the slave, as discussed above.

The second main clock generation part 226 generates a second main clock signal MCK2 using the spread spectrum clock signal SYNC_SSC provided from the first timing controller 210 (step S120). The second main clock signal MCK2 may be used as a pixel (or, alternatively, a dot) clock signal for controlling a pixel data in a source driving circuit (FIG. 1).

Therefore, the first and second main clock signals MCK1 and MCK2, respectively, are synchronized with each other because the first main clock generation part 216 and the second main clock generation part 226 generate the first and second main clock signals MCK1 and MCK2, respectively, using the spread spectrum clock signal SYNC_SSC which is the same source signal. Consequently, source driving circuits (FIG. 1), which are driven based on the synchronized first and second main clock signals MCK1 and MCK2, respectively, are synchronized with each other.

Figure 6:
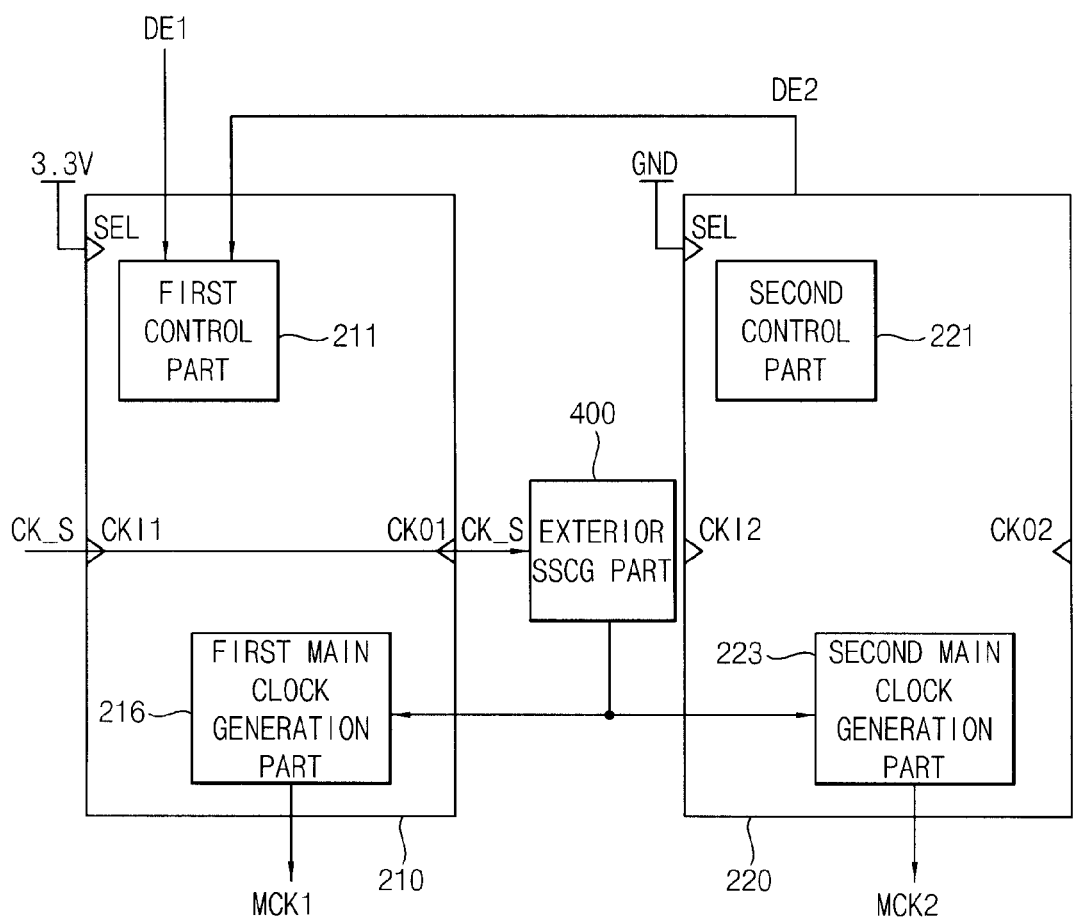
FIG. 6 is a block diagram for describing an exemplary embodiment of a synchronization of a spread spectrum clock signal between a master timing controller and a slave timing controller using an external SSCG part of the display apparatus of FIG. 1.
Figure 7:
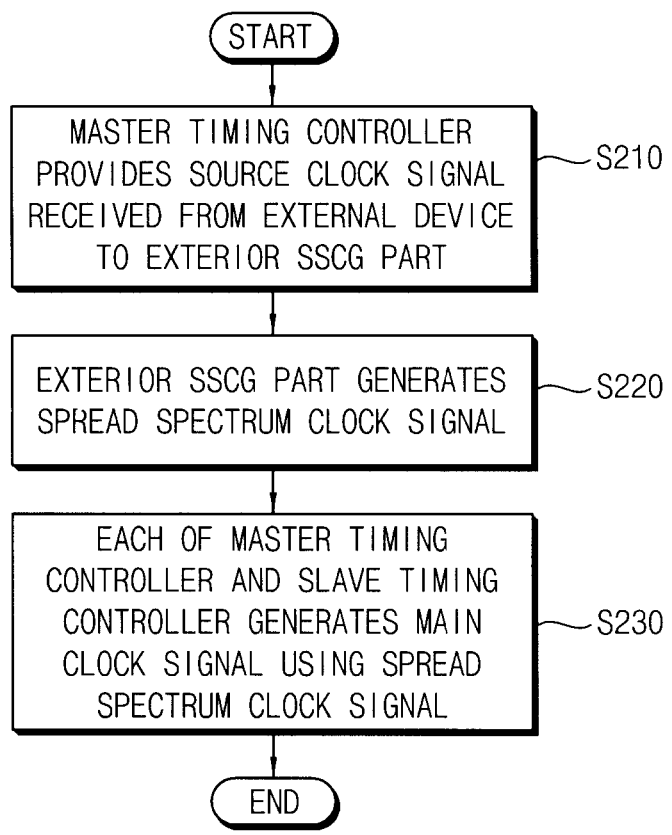
FIG. 7 is a flowchart for describing an exemplary embodiment of a method of driving the master timing controller and the slave timing controller in FIG. 6.

FIG. 6 is a block diagram for describing an exemplary embodiment of a synchronization of a spread spectrum clock signal between a master timing controller and a slave timing controller using an external SSCG part. FIG. 7 is a flowchart for describing an exemplary embodiment of a method of driving the master timing controller and the slave timing controller shown in FIG. 6.

Referring to FIGS. 2, 6 and 7, the first timing controller 210 according to an exemplary embodiment may further include a first input terminal CKI1 for receiving a source clock signal CK_S from an external source (not shown), a first output terminal CKO1 for outputting the source clock signal CK_S to an external SSCG part 400, e.g., an SSCG part 400 external to the first timing controller 210 and the second timing controller 220, and a first main clock generation part 216. The second timing controller 220 may further include a second main clock generation part 226, as shown in FIG. 6.

Hereinafter, an exemplary embodiment in which the first timing controller 210 is operated as a master timing controller 210 will be described, but it will be noted that alternative exemplary embodiments are not limited to this configuration.

The first timing controller 210 receives the source clock signal CK_S from the external source (not shown) through the first input terminal CKI1 and provides the source clock signal CK_S to the external SSCG part 400 through the first output terminal CKO1.

The external SSCG part 400 modulates the source clock signal CK_S to generate a spread spectrum clock signal SYNC_SSC for decreasing electromagnetic interference (step S220 of FIG. 7).

The external SSCG part 400 simultaneously provides the spread spectrum clock signal SYNC_SSC to the first main clock generation part 216 and the second timing controller 220.

The first main clock generation part 216 generates a first main clock signal MCK1 using the spread spectrum clock signal SYNC_SSC (step S230).

Hereinafter, an exemplary embodiment in which the second timing controller 220 is operated as a slave timing controller 220 will be described, but alternative exemplary embodiments are not limited thereto.

In an exemplary embodiment, the second timing controller 220 does not use a second input terminal CKI2 and a second output terminal CKO2 thereof, since the second timing controller 220 is operated as a slave to the first timing controller 210. Thus, the second input terminal CKI2 and the second output terminal CKO2 are electrically floated in the second timing controller 220.

The second main clock generation part 226 generates a second main clock signal MCK2 using the spread spectrum clock signal SYNC_SSC provided from the external SSCG part 400 (step S230).

Therefore, in an exemplary embodiment, the first and second main clock signals MCK1 and MCK2, respectively, are synchronized with each other, because the first main clock generation part 216 and the second main clock generation part 226 generate the first and second main clock signals MCK1 and MCK2, respectively, using the spread spectrum clock signal SYNC_SSC, which is the same source signal.

Figure 8:
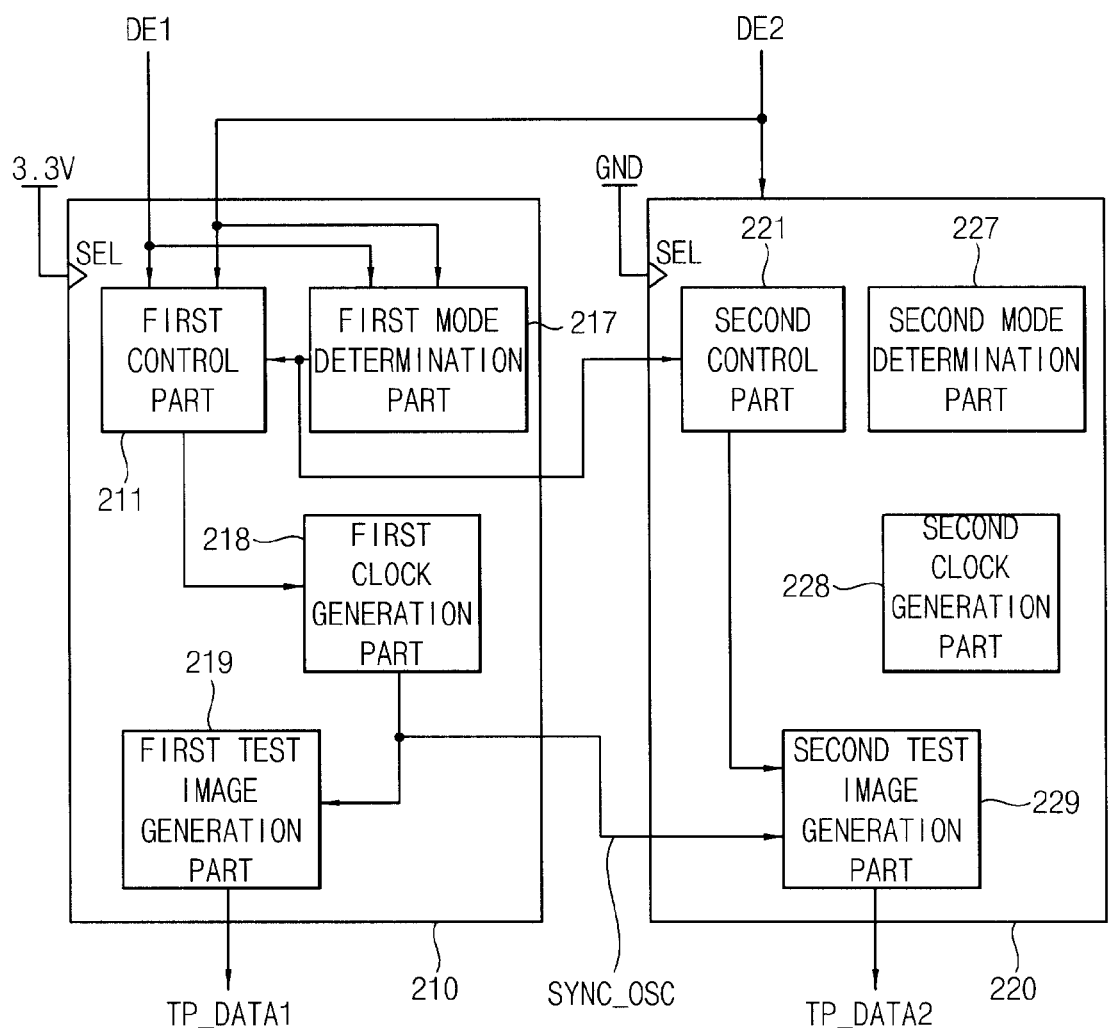
FIG. 8 is a block diagram for describing an exemplary embodiment of a synchronization of test data between a master timing controller and a slave timing controller in an abnormal mode.
Figure 9:
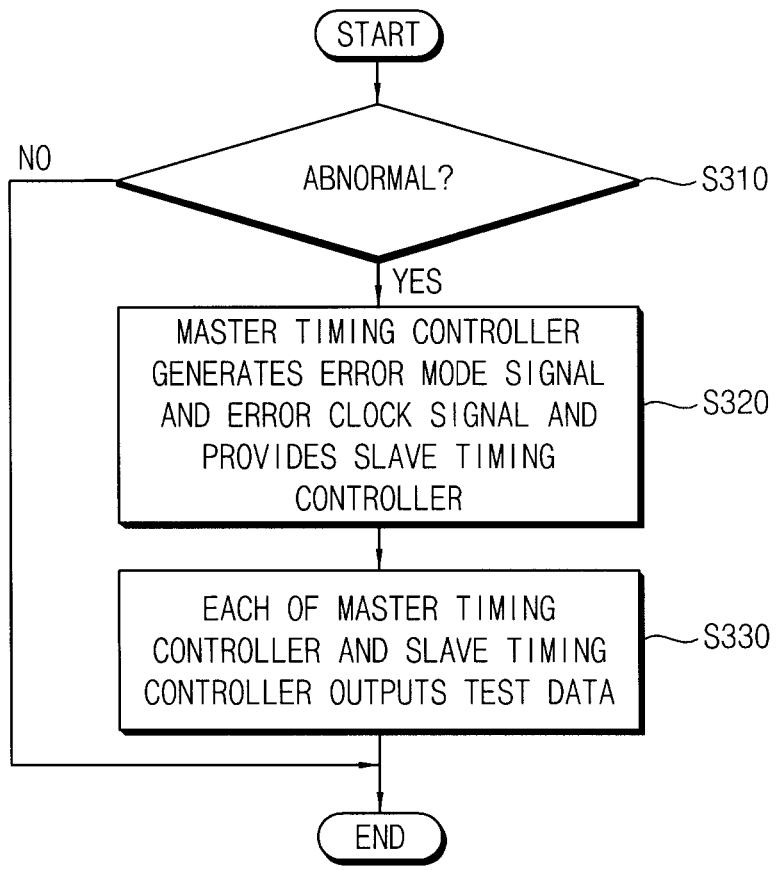
FIG. 9 is a flowchart for describing an exemplary embodiment of a method of driving the master timing controller and the slave timing controller in FIG. 8.

FIG. 8 is a block diagram for describing an exemplary embodiment of a synchronization of test data between a master timing controller and a slave timing controller in an abnormal mode. FIG. 9 is a flowchart for describing an exemplary embodiment of a method of driving the master timing controller and the slave timing controller shown in FIG. 8.

Referring to FIGS. 2, 8 and 9, the first timing controller 210 may further include a first mode determination part 217, a first clock generation part 218 and a first test image generation part 219, and the second timing controller 220 may further include a second mode determination part 227, a second clock generation part 228 and a second test image generation part 229.

Hereinafter, an exemplary embodiment in which the first timing controller 210 is operated as a master timing controller 210 will be described, but alternative exemplary embodiments are not limited thereto.

The first mode determination part 217 determines whether a present frame, e.g., a current frame, is normal or abnormal based on a first data enable signal DE1 and a second data enable signal DE2 (step S310 of FIG. 9).

More specifically, for example, in an exemplary embodiment, the first mode determination part 217 may count a number of clock signals corresponding to each of the first and second data enable signals DE1 and DE2, respectively, and the first mode determination part 217 may thereafter determine the present frame to be in a normal mode when the number of clock signals is in a predetermined range. In contrast, the first mode determination part 217 may determine the present frame to be in an abnormal mode when the number of clock signal deviates from, e.g., is outside of, the predetermined range.

In an alternative exemplary embodiment, however, the first mode determination part 217 may determine the present frame to be abnormal when a delay difference between a pulse of the first data enable signal DE1, firstly received by the first timing controller 210, and a pulse of the second data enable signal DE2, firstly received by the first timing controller 210, deviates from a predetermined range. Thus, the first mode determination part 217 may count a number of pulses between the pulse of the first data enable signal DE1 firstly received by the first timing controller 210 and the pulse of the second data enable signal DE2 firstly received by the first timing controller 210, and the first mode determination part 217 may determine the present frame to be normal when the number of the pulses is equal to or less than a predetermined critical value, or, conversely, the present frame to be abnormal when the number of the pulses is greater than the predetermined critical value. For example, in a case in which a memory has a capacity capable of storing eight lines of data, the first mode determination part 217 may determine the present frame to be abnormal when the number of the pulse is greater than eight. In an exemplary embodiment in which a capacity of the memory is large, e.g., has a capacity of storing more than eight lines of data, a compensation range for non-synchronization between data enable signals may be increased; however, this may increase costs. Therefore, the compensation range for non-synchronization between data enable signals may be determined in consideration of the capacity of the memory of a given exemplary embodiment, and the present frame may be determined to be in an abnormal mode when the number of the pulse deviates from the compensation range.

When the present frame is determined to be in a normal mode, as described above, the N timing controllers 210, 220, . . . , and 250 (FIG. 1) are driven in synchronization with each other in a normal driving method, such as the driving methods of the exemplary embodiments described in greater above with reference to FIGS. 2 and 3.

In contrast, when the present frame is determined to be in an abnormal mode, the timing controllers N 210, 220, . . . , and 250 are driven differently, as will now be described in greater detail with reference to FIGS. 8 and 9.

The first mode determination part 217 generates an error mode signal SYNC_FAIL, and simultaneously provides the error mode signal SYNC_FAIL to the first control part 211 and the second control part 221 (step S320). The first control part 211 drives the first timing controllers 210 in an abnormal mode in response to the error mode signal SYNC_FAIL.

The first clock generation part 218 generates an error clock signal SYNC_OSC in the abnormal mode, and simultaneously provides the error clock signal SYNC_OSC to the first test image generation part 219 and the second test image generation part 229 (step S320).

The first test image generation part 219 outputs a first test data TP_DATA1 using the error clock signal SYNC_OSC (step S330). The first test data TP_DATA1 is an image data corresponding to a test pattern for displaying on the display panel 100 in the abnormal mode.

Hereinafter, an exemplary embodiment in which the second timing controller 220 is operated as a slave timing controller 220 will be described, but alternative exemplary embodiments are not limited thereto.

The second control part 221 drives the second timing controller 220 in response to the error mode signal SYNC_FAIL provided from the first timing controller 210.

The second test image generation part 229 outputs a second test data TP_DATA2 using the error clock signal SYNC_OSC (step S330). The second test data TP_DATA2 is an image data corresponding to a test pattern for displaying on the display panel 100 in the abnormal mode.

In an exemplary embodiment in which the second timing controller 220 is operated as the slave timing controller 220, the second mode determination part 227 and the second clock generation part 228 do not substantially operate because the second timing controller 220 operates as the slave.

Figure 11:
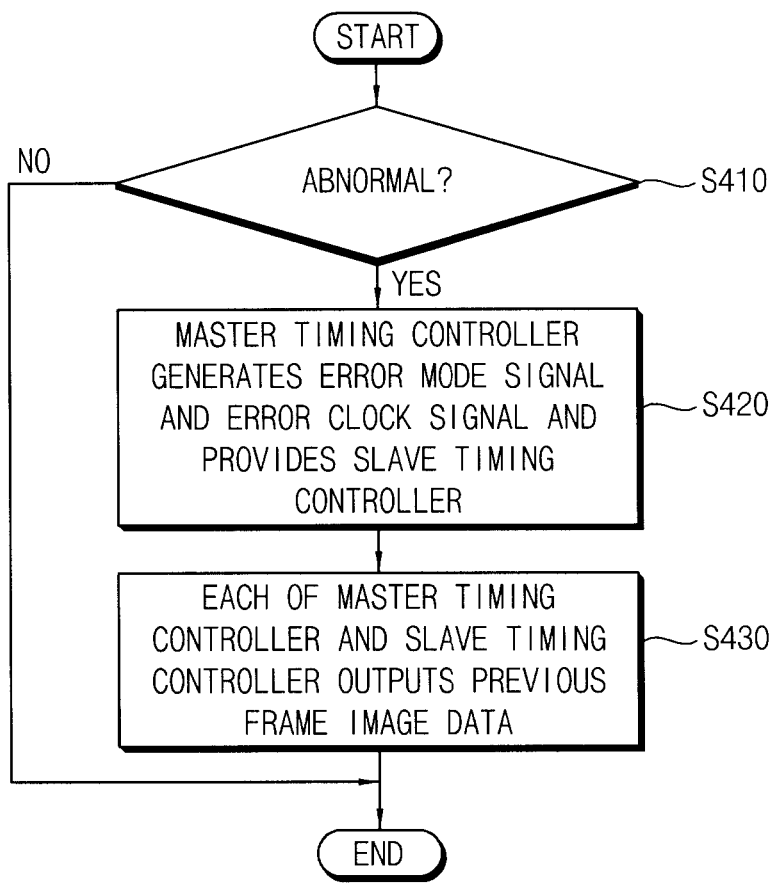
FIG. 11 is a flowchart for describing an alternative exemplary embodiment of a method of driving the master timing controller and the slave timing controller in FIG. 8.

FIG. 10 is a block diagram for describing an exemplary embodiment of a synchronization of a previous frame between a master timing controller and a slave timing controller in an abnormal mode. FIG. 11 is a flowchart for describing an alternative exemplary embodiment of a method of driving the master timing controller and the slave timing controller shown in FIG. 8.

Referring to FIGS. 2, 10 and 11, the first timing controller 210 may further include a first mode determination part 217, a first clock generation part 218 and a first frame memory 219A, and the second timing controller 220 may further include a second mode determination part 227, a second clock generation part 228 and a second frame memory 229A.

Hereinafter, an exemplary embodiment in which the first timing controller 210 is operated as a master timing controller 210 will be described, but alternative exemplary embodiments are not limited thereto.

The first mode determination part 217 determines whether a present frame, e.g., a current frame, is normal or abnormal based on a first data enable signal DE1 and a second data enable signal DE2 (step S410). As described above with reference to the exemplary embodiment shown in FIG. 8, the first mode determination part 217 may determine whether the present frame is normal or abnormal using a pulse period of the first and second data enable signals DE1 and DE2, respectively, and/or a delay difference between the first and second data enable signals DE1 and DE2, respectively. The first mode determination part 217 may determine the present frame to be abnormal when a high pulse period deviates from a predetermined range or a delay difference between a first pulse in a fastest data enable signal of the first and second data enable signals DE1 and DE2, respectively, and a first pulse in a slowest data enable signal of the first and second data enable signals DE1 and DE2, respectively, deviates from a predetermined range.

When the first mode determination part 217 determines the present frame to be abnormal, the first mode determination part 217 generates an error mode signal SYNC_FAIL and simultaneously provides the error mode signal SYNC_FAIL to the first control part 211 and the second control part 221 (step S420). The first control part 211 drives the first timing controllers 210 in an abnormal mode in response to the error mode signal SYNC_FAIL.

The first clock generation part 218 generates an error clock signal SYNC_OSC in response to the error mode signal SYNC_FAIL (step S420).

The first frame memory 219A stores first group image data DATA1(K−1) corresponding to a previous frame, e.g., a frame temporally previous to the present frame. More specifically, when the present frame, which is the abnormal frame, is a K-th frame, the previous frame is a (K−1)-th frame (where 'K' is a natural number).

The first frame memory 219A outputs the first group image data DATA1(K−1), corresponding to the previous frame, in response to the error clock signal SYNC_OSC in the abnormal mode. Therefore, the display panel 100 according to an exemplary embodiment displays image data corresponding to the previous frame in the abnormal mode.

Hereinafter, an exemplary embodiment in which the second timing controller 220 is operated as a slave will be described, but alternative exemplary embodiments are not limited thereto.

The second control part 221 drives the second timing controller 220 in response to the error mode signal SYNC_FAIL provided from the first timing controller 210.

The second frame memory 229A stores second group image data DATA2(K−1) corresponding to the previous frame. The second frame memory 229A outputs the second group image data DATA2(K−1) corresponding to the previous frame in response to the error clock signal SYNC_OSC in the abnormal mode (step S430). Therefore, the display panel 100 displays an image data corresponding to the previous frame in the abnormal mode.

In an exemplary embodiment, the second mode determination part 227 and the second clock generation part 228 do not operate, because the second timing controller 220 operates as the slave timing controller 220.

FIG. 12 is a block diagram illustrating an alternative exemplary embodiment of a display apparatus according to the present invention.

Referring to FIG. 12, the display apparatus according to an alternative exemplary embodiment includes a data repetition part 510, a data processing part 520, a driving part 530 and a display panel 540. The display apparatus may display a frame image having a resolution of 960×1,080 at a frequency of about 240 Hz.

The data repetition part 510 receives a frame image having a resolution of 1920×1,080 and a frequency of 60 Hz from an external source (not shown), and transmits the frame image to the data processing part 520 through two output terminals. When the resolution of a frame image received from the external system is different from the resolution of the display panel 540, a scaler (not shown) may be disposed before an input of the data repetition part 510 to match the resolution of the frame image received from the external source to the resolution of the display panel 540. A position of the scaler is not particularly limited in alternative exemplary embodiments. For example, the scaler may be connected to each of the output terminals of the data repetition part 510 to control the resolution of the frame image.

The data processing part 520 includes a first data processing circuit 521 and a second data processing circuit 522. The first data processing circuit 521 and the second data processing circuit 522 are connected to the output terminals of the data repetition part 510 to receive the frame image. Thus, the first data processing circuit 521 and the second data processing circuit 522 receive the same frame image. The first data processing circuit 521 includes a frame rate controller ("FRC"). For example, the first data processing circuit 521 processes a first group image, corresponding to a first display block of the received frame image, to generate an interpolation frame image data, which is motion-interpolated based on a present a K-th first group frame image and a previous (K−1)-th first group frame image, using the frame rate controller, and then outputs the interpolation frame image data. In an exemplary embodiment, for example, the first data processing circuit 521 may process first group image data having a resolution of 960×1,080 and a frequency of about 60 Hz, generate three interpolation frame image data, which is motion-interpolated between a K-th frame image and a (K−1)-th frame image, and output the interpolation frame image to output an image data corresponding to a first display block IA1 having frequency of about 240 Hz including the K-th frame image and the three interpolation frame image data.

The second data processing circuit 522 is driven by a driving method substantially the same as the driving method of the first data processing circuit 521 to output second group image data corresponding to a second display block IA2 and having a resolution of 960×1,080 and frame frequency of about 240 Hz.

The driving part 530 according to an exemplary embodiment includes a first timing controller 531 and a second timing controller 532. Each of the first timing controller 531 and the second timing controller 532 processes the image data having a resolution of 960×1,080 and frame frequency of about 240 Hz. The first timing controller 531 and the second timing controller 532 output the image data having a resolution of 960×1,080 and frame frequency of about 240 Hz to the first and second image blocks IA1 and IA2, respectively. Therefore, the display panel 540 displays a frame image having a resolution of 960×1,080 at a frame frequency of about 240 Hz.

In an exemplary embodiment, the first timing controller 531 is set as a master timing controller 531, and the second timing controller 532 is set as a slave timing controller 532, but alternative exemplary embodiments are not limited thereto. The first timing controller 531 and the second timing controller 532 are synchronized with each other by one of the methods described above with reference to the exemplary embodiments shown in FIG. 2 through FIG. 11.

Therefore, the first group image data outputted from the first timing controller 531 and the second group image data outputted from the second timing controller 532 are synchronized each other and provided to the display panel 540.

Additionally, the first timing controller 531 and the second timing controller 532 may each output a synchronized main clock signal. The main clock signal is a pixel (or, alternatively, a dot) clock signal used in a source driving circuit (FIG. 1) and the main clock signal controls a driving of the source driving circuit. Therefore, the first timing controller 531 and the second timing controller 532 may synchronize a driving timing of source driving circuits substantially driving the first and second display blocks IA1 and IA2, respectively, of the display panel 540.

FIG. 13 is a block diagram illustrating another alternative exemplary embodiment of a display apparatus according to the present invention.

Referring to FIG. 13, the display apparatus includes a data repetition part 610, a data processing part 620, a driving part 630 and a display panel 640. The display apparatus according to another alternative exemplary embodiment may display a frame image having a resolution of 3,840×2,160 at a frequency of about 120 Hz.

The data repetition part 610 receives a frame image having a resolution of 3,840×2,160 and frequency of about 60 Hz from an external source (not shown), and transmits the frame image to the data processing part 620 through four output terminals. When the resolution of a frame image received from the external system is different from the resolution of the display panel 640, a scaler (not shown) may be disposed before an input of the data repetition part 510. Thus, the data repetition part 610 may receive a frame image of which resolution is substantially equal to the resolution of the display panel 640 through the scaler, as described above.

The data processing part 620 includes a first data processing circuit 621, a second data processing circuit 622, a third data processing circuit 623 and a fourth data processing circuit 624. The first, second, third and fourth data processing circuits 621, 622, 623 and 624, respectively, are connected to the output terminals of the data repetition part 610 to receive the same frame image. The first data processing circuit 621 includes a frame rate controller. In an exemplary embodiment, for example, the first data processing circuit 621 generates an interpolation frame image data, which is motion-interpolated based on a present K-th frame image and a previous (K−1)-th frame image, using the frame rate controller. The first data processing circuit 621 outputs first group image data corresponding to a first display block IA1 and having a resolution of 960×2,160 and frequency of about 120 Hz.

The second data processing circuit 622 outputs second group image data corresponding to a second display block IA2 and having a resolution of 960×2,160 and frequency of about 120 Hz, the third data processing circuit 623 outputs third group image data corresponding to a third display block IA3 and having a resolution of 960×2,160 and frequency of about 120 Hz and the fourth data processing circuit 624 outputs fourth group image data corresponding to a fourth display block IA4 and having a resolution of 960×2,160 and frequency of about 120 Hz, by a driving method substantially the same as the exemplary embodiment of the driving method of the first data processing circuit 621. In an alternative exemplary embodiment, a configuration of the scaler is not limited the above-mentioned description. When the resolution of an input frame image is different from the resolution of an output frame image, the scaler may be disposed at each of the output terminals of the data repetition part 610, and the scaler may be disposed in respective output terminals of the first through fourth data processing circuits 621, 622, 623 and 624, respectively.

The driving part 630 includes a first timing controller 631, a second timing controller 632, a third timing controller 633 and a fourth timing controller 634. Each of the first, second, third, and fourth timing controllers 631, 632, 633 and 644, respectively, processes the image data having a resolution of 960×2,160 and frame frequency of about 120 Hz. The first, second, third and fourth timing controllers 631, 632, 633 and 634, respectively, output the image data having a resolution of 960×2,160 and frame frequency of about 120 Hz to the first, second, third and fourth image blocks IA1, IA2, IA3 and IA4, respectively. Therefore, the display panel 640 according to an exemplary embodiment displays a frame image having a resolution of 3,840×2,160 and a frame frequency of about 120 Hz.

In an exemplary embodiment, the first timing controller 631 is set as a master timing controller 631, while the second, third and fourth timing controllers 632, 633 and 634, respectively, are set as slaves. The first, second, third and fourth timing controllers 631, 632, 633 and 634, respectively, are synchronized with each other by a method according to one of the exemplary embodiments described in greater detail above with reference to FIG. 2 through FIG. 11.

Thus, according to exemplary embodiments of the present invention as described herein, when a plurality of timing controllers are used to display high-resolution and high-definition images, a decrease in display quality generated by non-synchronization of the timing controllers is substantially reduced and/or is effectively prevented by synchronizing timing controllers of the plurality of timing controllers with each other.

The present invention should not be construed as being limited to the exemplary embodiments set forth herein. Rather, these exemplary embodiments are provided so that this disclosure will be thorough and complete and will fully convey the concept of the present invention to those skilled in the art.

What is claimed is:

1. A method of synchronizing a driving device comprising a plurality of timing controllers, the method comprising:
receiving a plurality of data enable signals from an external source, each at different times; and
generating a synchronization signal in a master timing controller using a first data enable signal received by the master timing controller of the timing controllers at a first time and a second data enable signal received by at least one slave timing controller of the timing controllers at a second time, the first time being one of before or after the second time, the master timing controller receiving both the first data enable signal and the second data enable signal, and the generating the synchronization signal comprising
generating a synchronized data enable signal based on a later received signal of the first data enable signal and the second data enable signal supplied to the master timing controller,
wherein respective line data are supplied from the timing controllers to corresponding source driving circuits simultaneously based on the synchronized data enable signal.

2. The method of claim 1, wherein
the master timing controller and the slave timing controller each include a selection terminal, and
a state of each of the master timing controller and the slave timing controller is determined by a voltage level received at the selection terminal thereof.

3. The method of claim 1, further comprising:
outputting first group image data based on the synchronized data enable signal using the master timing controller;
storing the first group image data based on the first data enable signal;
outputting second group image data based on the data enable synchronization signal by the slave timing controller; and
storing the second group image data based on the second data enable signal.

4. The method of claim 1, further comprising:
modulating a source clock signal to generate a spread spectrum clock signal using the master timing controller; and
generating main clock signals with the master timing controller and the slave timing controller using the spread spectrum clock signal, wherein
the source clock signal is generated in the master timing controller, and
the spread spectrum clock signal decreases electromagnetic interference in the driving device.

5. The method of claim 1, further comprising:
transferring a source clock signal to an external spread spectrum clock generation part with the master timing controller, the source clock signal received external from the master timing controller;
modulating the source clock signal to generate a spread spectrum clock signal with the external spread spectrum clock generation part; and
generating main clock signals with the master timing controller and the slave timing controller using the spread spectrum clock signal,
wherein the spread spectrum clock signal decreases electromagnetic interference in the driving device.

6. The method of claim 1, further comprising:
determining whether a present frame is normal with the master timing controller using the first data enable signal and the second data enable signal;
generating an error mode signal with the master timing controller when the present frame is abnormal; and
operating the master timing controller and the slave timing controller in one of a normal mode and an abnormal mode based on the error mode signal.

7. The method of claim 6, wherein the determining whether the present frame is normal comprises determining the present frame is abnormal when a pulse period of each of the first data enable signal and the second data enable signal deviates from a predetermined range.

8. The method of claim 6, wherein the determining whether the present frame is normal comprises determining the present frame is abnormal when a delay difference between a pulse of the first data enable signal, received first with respect to other signals by the master timing controller, and a pulse of the second data enable signal, received first with respect to other signals by the slave timing controller, deviates from a predetermined range.

9. The method of claim 6, wherein the operating the master timing controller and the slave timing controller in one of the normal mode and the abnormal mode comprises:
generating an error clock signal using the master timing controller; and
outputting first group image data and second group image data in response to the error clock signal,
wherein the first group image data and the second group image data correspond to a previous frame, the present frame being temporally adjacent and subsequent to the previous frame.

10. The method of claim 1, wherein the synchronized data enable signal is received by each slave timing controller at a same time.

11. A display apparatus comprising:
a driving part comprising a plurality of timing controllers, the timing controllers comprising:

a master timing controller comprising a synchronization signal generation part, the synchronization signal generation part generating a synchronized data enable signal; and at least one slave timing controller synchronized with the master timing controller; and a display panel which displays a first image on a first display block and displays a second image on a second display block using the synchronized data enable signal, wherein the synchronized data enable signal is generated in the master timing controller using a first data enable signal received by the master timing controller at a first time and a second data enable signal received by the slave timing controller at a second time, and the first time is one of before or after the second time, wherein the master timing controller receives both the first data enable signal and the second data enable signal, and the synchronized data enable signal is generated based on a later received signal of the first data enable signal and the second data enable signal supplied to the master timing controller, and wherein respective line data are supplied from the timing controllers to corresponding source driving circuits simultaneously based on the synchronized data enable signal.

12. The display apparatus of claim 11, wherein
the master timing controller and the slave timing controller each includes a selection terminal, and
a state of each of the master timing controller and the slave timing controller is determined by a voltage level received at the selection terminal.

13. The display apparatus of claim 11, wherein
the master timing controller outputs first group image data based on the synchronized data enable signal, the first group image data being stored based on the first data enable signal, and
the slave timing controller outputs second group image data base on the synchronized data enable signal, the second group image data being stored based on the second data enable signal.

14. The display apparatus of claim 11, wherein the master timing controller comprises an interior spread spectrum clock generation part which modulates a source clock signal generated in the master timing controller to generate a spread spectrum clock signal for decreasing electromagnetic interference, and
the master timing controller and the slave timing controller each generate a main clock signal using the spread spectrum clock signal.

15. The display apparatus of claim 11, further comprising:
an external spread spectrum clock generation pa r t which modulates a source clock signal to generate a spread spectrum clock signal for decreasing electromagnetic interference,
wherein the master timing controller and the slave timing controller each generate a main clock signal using the spread spectrum clock signal.

16. The display apparatus of claim 15, wherein the master timing controller receives the source clock signal from a source external to the master timing controller and outputs the source clock signal to the external spread spectrum clock generation part.

17. The display apparatus of claim 11, wherein
the master timing controller comprises a mode determination part which determines whether a present frame is normal using the first data enable signal and the second data enable signal and generates an error mode signal when the present frame is abnormal, and
the master timing controller and the slave timing controller operate in one of a normal mode and an abnormal mode based on the error mode signal.

18. The display apparatus of claim 17, wherein the mode determination part determines the present frame is abnormal when pulse periods of each of the first data enable signal and the second data enable signal deviate from a predetermined range.

19. The display apparatus of claim 17, wherein the mode determination part determines the present frame is abnormal when a delay difference between a pulse of the first data enable signal, received first with respect to other signals by the master timing controller and a pulse of the second data enable signal, received first with respect to other signals by the slave timing controller, deviates from a predetermined range.

20. The display apparatus of claim 17, wherein
the master timing controller comprises:
a clock generation part which generates an error clock signal when the master timing controller operates in the abnormal mode; and
a first test image generation part which generates a first group test data in response to the error clock signal, and
the slave timing controller comprises a second test image generation part which generates a second group test data in response to the error clock signal.

21. The display apparatus of claim 11, wherein the synchronized data enable signal is received by each slave timing controller at a same time.

* * * * *